(12) United States Patent
Mei et al.

(10) Patent No.: US 9,234,801 B2
(45) Date of Patent: Jan. 12, 2016

(54) MANUFACTURING METHOD FOR LED EMITTER WITH HIGH COLOR CONSISTENCY

(71) Applicant: LedEngin Inc, San Jose, CA (US)

(72) Inventors: Zequn Mei, Fremont, CA (US); Danny Gonzales, Palo Alto, CA (US); Xiantao Yan, Palo Alto, CA (US); William E. Armstrong, Palo Alto, CA (US)

(73) Assignee: LedEngin, Inc., San Jose, CA (US)

( * ) Notice: Subject to any disclaimer, the term of this patent is extended or adjusted under 35 U.S.C. 154(b) by 119 days.

(21) Appl. No.: 14/214,479

(22) Filed: Mar. 14, 2014

(65) Prior Publication Data

US 2014/0268153 A1      Sep. 18, 2014

Related U.S. Application Data

(60) Provisional application No. 61/801,063, filed on Mar. 15, 2013.

(51) Int. Cl.
*H01L 21/00* (2006.01)
*G01J 3/46* (2006.01)

(52) U.S. Cl.
CPC ..................................... *G01J 3/463* (2013.01)

(58) Field of Classification Search
None
See application file for complete search history.

(56) References Cited

U.S. PATENT DOCUMENTS

| | | |
|---|---|---|
| 4,514,489 A | 4/1985 | Garcia et al. |
| 5,959,316 A | 9/1999 | Lowery |
| 6,307,160 B1 | 10/2001 | Mei et al. |
| 6,351,069 B1 | 2/2002 | Lowery et al. |
| 6,495,964 B1 | 12/2002 | Muthu et al. |
| 6,608,332 B2 | 8/2003 | Shimizu et al. |
| 6,614,179 B1 | 9/2003 | Shimizu et al. |
| 6,642,652 B2 | 11/2003 | Collins, III et al. |

(Continued)

FOREIGN PATENT DOCUMENTS

| | | |
|---|---|---|
| JP | 2000-349346 | 12/2000 |
| JP | 2000-349347 | 12/2000 |

(Continued)

OTHER PUBLICATIONS

Kading, "Thermal conduction in metallized silicon-dioxide layers on silicon," Appl. Phys. Lett 65, 1994, pp. 1629-1631.

(Continued)

*Primary Examiner* — Seahvosh Nikmanesh
(74) *Attorney, Agent, or Firm* — Kilpatrick Townsend & Stockton LLP

(57) ABSTRACT

A method is provided for forming multiple-LED (light-emitting-diode) light emitters from a plurality of LEDs, wherein the number of LEDs in each emitter is an integer M. The method includes providing a plurality of LEDs, each of the LEDs characterized by a first parameter and a second parameter, which are related to color coordinates CIEx and CIEy in a chromaticity diagram. The method also includes determining first and second parameter $X_0$ and $Y_0$ for a target color. The method further includes, for all possible combinations of M LEDs out of the plurality of LEDs, determining a first group parameter and a second group parameter based on the first and second parameters for all of the M LEDs, and selecting a group of M LEDs whose first group parameter and second group parameter are closest to $X_0$ and $Y_0$ as a candidate for forming a light emitter of M LEDs.

20 Claims, 4 Drawing Sheets

(56) References Cited

U.S. PATENT DOCUMENTS

| | | | |
|---|---|---|---|
| 6,650,044 B1 | 11/2003 | Lowery | |
| 6,680,128 B2 | 1/2004 | Mei | |
| 6,682,331 B1 | 1/2004 | Peh et al. | |
| 6,791,116 B2 | 9/2004 | Takahashi et al. | |
| 6,828,170 B2 | 12/2004 | Roberts et al. | |
| 7,049,159 B2 | 5/2006 | Lowery | |
| 7,064,353 B2 | 6/2006 | Bhat | |
| 7,139,125 B1 | 11/2006 | Mi | |
| 7,156,538 B2 | 1/2007 | Han et al. | |
| 7,157,744 B2 | 1/2007 | Palmteer et al. | |
| 7,168,608 B2 | 1/2007 | Mei | |
| 7,199,446 B1 | 4/2007 | Mei et al. | |
| 7,256,057 B2 * | 8/2007 | Schardt | H01L 33/50 438/14 |
| 7,264,378 B2 | 9/2007 | Loh | |
| 7,442,326 B2 * | 10/2008 | Setlur | C09K 11/7774 252/301.4 F |
| 7,465,069 B2 | 12/2008 | Li | |
| 7,473,933 B2 | 1/2009 | Yan | |
| 7,670,872 B2 | 3/2010 | Yan | |
| 7,772,609 B2 | 8/2010 | Yan | |
| 8,330,176 B2 | 12/2012 | Thompson et al. | |
| 8,384,097 B2 | 2/2013 | Yan | |
| 2001/0015778 A1 | 8/2001 | Murade | |
| 2002/0004251 A1 | 1/2002 | Roberts et al. | |
| 2002/0015013 A1 | 2/2002 | Ragle | |
| 2002/0053515 A1 | 5/2002 | Nemelka | |
| 2002/0163006 A1 | 11/2002 | Yoganandan et al. | |
| 2002/0191885 A1 | 12/2002 | Wu et al. | |
| 2003/0016899 A1 | 1/2003 | Yan | |
| 2003/0080341 A1 | 5/2003 | Sakano et al. | |
| 2003/0086674 A1 | 5/2003 | Yan et al. | |
| 2003/0095399 A1 | 5/2003 | Grenda et al. | |
| 2003/0116769 A1 | 6/2003 | Song et al. | |
| 2003/0122482 A1 | 7/2003 | Yamanaka et al. | |
| 2003/0227249 A1 | 12/2003 | Mueller et al. | |
| 2003/0230753 A1 | 12/2003 | Steckl et al. | |
| 2003/0230977 A1 | 12/2003 | Epstein | |
| 2004/0004437 A1 | 1/2004 | Shimizu et al. | |
| 2004/0051111 A1 | 3/2004 | Ota et al. | |
| 2004/0079957 A1 | 4/2004 | Andrews et al. | |
| 2004/0087165 A1 | 5/2004 | Theiss et al. | |
| 2004/0102061 A1 | 5/2004 | Watanabe | |
| 2004/0114393 A1 | 6/2004 | Galli | |
| 2004/0126918 A1 | 7/2004 | Kurahashi et al. | |
| 2004/0150991 A1 | 8/2004 | Ouderkirk et al. | |
| 2004/0173810 A1 | 9/2004 | Lin et al. | |
| 2004/0201025 A1 | 10/2004 | Barnett | |
| 2004/0257496 A1 | 12/2004 | Sonoda | |
| 2005/0035364 A1 | 2/2005 | Sano et al. | |
| 2005/0093146 A1 | 5/2005 | Sakano | |
| 2005/0127281 A1 | 6/2005 | Zheng et al. | |
| 2005/0145872 A1 | 7/2005 | Fang et al. | |
| 2005/0179376 A1 | 8/2005 | Fung et al. | |
| 2005/0199900 A1 | 9/2005 | Lin et al. | |
| 2005/0224830 A1 | 10/2005 | Blonder et al. | |
| 2005/0253242 A1 | 11/2005 | Costello et al. | |
| 2005/0286131 A1 | 12/2005 | Saxena et al. | |
| 2006/0012299 A1 | 1/2006 | Suehiro et al. | |
| 2006/0063287 A1 | 3/2006 | Andrews | |
| 2006/0082296 A1 | 4/2006 | Chua et al. | |
| 2006/0082679 A1 | 4/2006 | Chua et al. | |
| 2006/0091416 A1 | 5/2006 | Yan | |
| 2006/0091788 A1 | 5/2006 | Yan | |
| 2006/0097385 A1 | 5/2006 | Negley | |
| 2006/0170332 A1 | 8/2006 | Tamaki et al. | |
| 2006/0226956 A1 * | 10/2006 | Young | G09F 9/33 340/286.01 |
| 2006/0284209 A1 | 12/2006 | Kim et al. | |
| 2007/0023769 A1 | 2/2007 | Nishimoto et al. | |
| 2007/0062032 A1 | 3/2007 | Ter-Hovhannissian | |
| 2007/0081360 A1 | 4/2007 | Bailey et al. | |
| 2007/0085103 A1 | 4/2007 | Nishioka et al. | |
| 2007/0139437 A1 * | 6/2007 | Boroson | G09G 3/3225 345/590 |
| 2007/0178629 A1 | 8/2007 | Ogawa et al. | |
| 2007/0194341 A1 | 8/2007 | Chang et al. | |
| 2007/0241357 A1 | 10/2007 | Yan | |
| 2008/0035942 A1 | 2/2008 | Kim et al. | |
| 2008/0076316 A1 | 3/2008 | Negley et al. | |
| 2008/0203415 A1 | 8/2008 | Thompson et al. | |
| 2008/0290351 A1 | 11/2008 | Ajiki et al. | |
| 2008/0308825 A1 | 12/2008 | Chakraborty et al. | |
| 2009/0057701 A1 | 3/2009 | Chao et al. | |
| 2010/0181582 A1 | 7/2010 | Li et al. | |
| 2010/0252845 A1 | 10/2010 | Lin et al. | |
| 2010/0317132 A1 | 12/2010 | Rogers et al. | |
| 2011/0012512 A1 | 1/2011 | Young et al. | |
| 2011/0073882 A1 | 3/2011 | Xu | |
| 2011/0073896 A1 | 3/2011 | Xu | |
| 2011/0189808 A1 | 8/2011 | Watanabe et al. | |
| 2012/0068209 A1 | 3/2012 | Andrews et al. | |
| 2012/0104450 A1 | 5/2012 | Chen et al. | |
| 2012/0286669 A1 | 11/2012 | Yan et al. | |

FOREIGN PATENT DOCUMENTS

| | | |
|---|---|---|
| JP | 2001-057445 | 2/2001 |
| JP | 2002-185046 | 6/2002 |
| JP | 2004-241704 | 8/2004 |
| JP | 2004-253404 | 9/2004 |
| TW | 200910644 A | 3/2009 |
| TW | 201037867 A | 10/2010 |
| WO | WO2010023993 | 3/2010 |

OTHER PUBLICATIONS

Yan, Xiantao, et al., "Two Test Specimens for Determining the Interfacial Fracture Toughness in Flip-Chip Assemblies," Transactions of the ASME, vol. 120, Jun. 1998, p. 150.

Yan, Xiantao, "Analysis Based Design Guidelines for Metal Runner and Passivation Layers in IC Packaging," Delphi Automotive Systems Analytical Engineering Conference, May 2000, p. 1.

"Solvent Soluble Polyimide with High Transparency and High Tg: HOP-400, 500", Hitachi Cable Review, Aug. 2003, No. 22, p. 78.

Office Action issued by the Taiwan Patent Office for patent application TW101148675 (Dec. 27, 2014).

Final Office Action for U.S. Appl. No. 13/272,768 dated Dec. 4, 2014, 8 pages.

Non-Final Office Action for U.S. Appl. No. 14/231,406 dated Feb. 3, 2015, 14 pages.

* cited by examiner

MANUFACTURING METHOD FOR LED EMITTER WITH HIGH COLOR CONSISTENCY

CROSS-REFERENCES TO RELATED APPLICATIONS

This application claims priority to U.S. Provisional Patent Application No. 61/801,063, filed Mar. 15, 2013, which is incorporated by reference in its entirety herein. This application is also related to U.S. Pat. No. 8,399,268 to Z. Mei and U.S. Pat. No. 8,384,097 to X. Yan, both of which are commonly owned and are incorporated by reference in their entirety herein.

BACKGROUND OF THE INVENTION

The present invention relates in general to light emitters based on light-emitting diodes (LEDs) and in particular to methods for achieving high color consistency light emitters that include multiple LEDs.

With the incandescent light bulb producing more heat than light, the world is eager for more efficient sources of artificial light. LEDs are a promising technology and are already widely deployed for specific purposes, such as traffic signals and flashlights. However, the development of LED-based lamps for general illumination has run into various difficulties. Among these is the difficulty of mass-producing lamps that provide a consistent color temperature.

As is known in the art, not all white light is the same. The quality of white light can be characterized by a color temperature, which ranges from the warm (slightly reddish or yellowish) glow of standard tungsten-filament light bulbs to the cool (bluish) starkness of fluorescent lights. Given existing processes for LED manufacture, mass-producing white LEDs with a consistent color temperature has proven to be a challenge.

Various solutions have been tried. For example, white LEDs can be binned according to color temperature and the LEDs for a particular lamp can be selected from the desired bin. However, the human eye is sensitive enough to color-temperature variation that a large number of bins is required, with the yield in any particular bin being relatively low.

Another solution relies on mixing different colors of light to produce a desired temperature. For example, an LED lamp can include a number of white LEDs plus some red LEDs. The brightness of the red LEDs can be increased to warm the light to the desired color temperature. Such lamps generally require an active feedback mechanism to maintain the color temperature, in part because the LEDs used are not stable in their color characteristics over time. The active feedback mechanism requires a sensor to detect the light being produced, an analyzer to determine whether the light is at the desired color, and an adjustment mechanism to adjust the relative brightness of the white and red LEDs as needed to maintain the desired color. These feedback-loop elements can be a weak point in the system; for example, if the light sensor drifts over time (as most do), so will the color of the light. In addition, incorporating active feedback components into a lamp drives up the cost of manufacturing (and operating) the lamp.

BRIEF SUMMARY OF THE INVENTION

Embodiments of the present invention relate to apparatus and techniques for achieving a desired color or color temperature for LED-based light emitters or lamps. Particular embodiments are adapted for use with lamps that include a group of LEDs selected from a plurality of LEDs. Groups of LEDs are characterized according to group properties of the group of LEDS characterized from color coordinates CIEx and CIEy of the LEDs in the group. The group whose group properties best match that of a target light color is chosen as a candidate for making a multiple-LED emitter. In some embodiment, the target color may be determined with a weighted average property of the plurality of LEDs, and the group properties may be determined with a weighted average property of each group of LEDs. Experimental data show that, starting with a plurality of LEDs that has large variations in its distribution of colors, methods in this invention can be used to select groups of LEDs to produce multiple-LED emitters with a tight color distribution within a region of the target color in a chromaticity diagram no larger than a 1-step MacAdam ellipse. In other words, the emitted colors are virtually indistinguishable to the average human eye.

According to some embodiments of the present invention, a method is provided for forming multiple-LEDs (light-emitting-diodes) light emitters from a plurality of LEDs. In an example, the number of LEDs in each emitter is an integer M. The method includes determining color coordinates CIEx and CIEy and intensity for each of a plurality of LEDs, wherein CIEx and CIEy are color coordinates in a CIE chromaticity diagram, and N is the number of LEDs in the plurality of LEDs. The method also includes determining a first parameter $X_0$ and a second parameter $Y_0$ for a target light color, wherein $X_0$ and $Y_0$ are related to CIEx and CIEy of each of the N LEDs and a weighting factor related to the intensity of each of the N LEDs. All possible groupings of M LEDs are examined to select the groupings that provide low color variations. For each possible group of M LEDs out of the N LEDs in the plurality of LEDs, the method includes determining a first group parameter X and a second group parameter Y, wherein X and Y are related to CIEx and CIEy of each of the M LEDs and a weighting factor related to the intensity of each of the M LEDs, and determining a difference between the first and second group parameters X and Y of each LED in the group of M LEDs and $X_0$ and $Y_0$. The differences are examined, and the method selects a first group of M LEDs whose first group parameter X and second group parameter Y are closest to $X_0$ and $Y_0$ as a first candidate for forming a light emitter with M LEDs. The method also includes removing the selected first group of M LEDs from the plurality of LEDs, and for the LEDs remaining in the plurality of LEDs, repeating the above processes to select a group of M LEDs as the next candidate for forming a light emitter.

In an embodiment of the above method, the weighting factor is related to the lumen of the LEDs. In an alternative embodiment, the weighting factor is related to a ratio of lumen over CIE-y of each LED. In yet another embodiments, the weighting factor is related to radiant power of the LEDs.

In another embodiment, the first parameter $X_0$ of the target light color is related to a sum of the CIEx of each of N LEDs multiplied by a ratio of the radiant power of each of the N LEDs divided by a sum of the radiant power of all N LEDs, and the second parameter $Y_0$ of the target light color is related to a sum of the CIEy of each of N LEDs multiplied by a ratio of the radiant power of each of the N LEDs divided by a sum of the radiant power of all N LEDs.

In another embodiment the first group parameter X of each of the possible groups of M LEDs is related to a sum of the CIEx of each of M LEDs multiplied by a ratio of the radiant power of each of the M LEDs divided by a sum of the radiant power of all M LEDs in that group, and the second group parameter Y of each of the possible groups of M LEDs is related to a sum of the CIEy of each of M LEDs multiplied by a ratio of the radiant power of each of the M LEDs divided by a sum of the radiant power of all M LEDs in that group.

In another embodiment, selecting the first group of M LEDs includes calculating a root mean square difference between (X,Y) and ($X_0$,$Y_0$), wherein X and Y are the first and the second group parameters for each of the possible groups of M LEDs, and $X_0$ and $Y_0$ are first and the second parameters of the target light color, and selecting a group with the minimum root mean square difference.

In some embodiments of the above method, each of the LEDs includes an LED chip having a phosphor-containing material disposed thereon. In some embodiments, each of the LEDs includes a blue LED having a phosphor-containing material including a green phosphor and a red phosphor disposed thereon. In some embodiments, each of the LEDs includes a blue LED having a phosphor-containing material including a yellow phosphor and a red phosphor disposed thereon.

According to another embodiment of the present invention, a method for forming multiple-LED (light-emitting-diode) light emitters from a plurality of LEDs, includes characterizing the plurality of LEDs according to first and second parameters of each LED, the first and second parameters being related to color coordinates CIEx and CIEy in a chromaticity diagram, respectively. The method also includes determining a target color, which is characterized by a first and second parameters, $X_0$ and $Y_0$, that are related to color coordinates CIEx and CIEy in the chromaticity diagram. For all possible combinations of M LEDs out of the LEDs in the plurality of LEDs, the method includes determining a first group parameter X and a second group parameter Y based on the first and second parameters for each of the M LEDs in the group, and determining a difference between the first and second parameters of each group and $X_0$ and $Y_0$. The method further includes selecting a group of M LEDs that has the smallest difference as a candidate for forming a light emitter of M LEDs.

In an embodiment of the present invention, the method further includes removing the selected group of M LEDs from the plurality of LEDs, and for the remaining LEDs, repeating the process of selecting a group of M LEDs for forming a multiple-LED emitter.

In some embodiments, the first parameter $X_0$ and the second parameter $Y_0$ for the target light color is further related to a weighting factor related to the intensity of each of the plurality of LEDs. In an embodiment, the weighting factor is related to the lumen of the LEDs. In another embodiment, each of the weighting factor is related to a ratio of lumen over CIE-y of each LED. In another embodiment, the weighting factors are related to the radiant power of the LEDs.

In some embodiments, the first group parameter X and the second group parameter Y for the group of M LEDs is further related to a weighting factor related to the intensity of each of the M LEDs. In an embodiment, the weighting factors are related to the lumen of the LEDs. In another embodiment, the weighting factors are related to the radiant power of the LEDs.

In some embodiments, each of the LEDs includes an LED chip having a phosphor-containing material disposed thereon.

According to some embodiments of the present invention, a method is provided for forming multiple-LED (light-emitting-diode) light emitters from a plurality of LEDs. In an example, the number of LEDs in each emitter is an integer M. The method includes providing a plurality of LEDs, each of the LEDs characterized by multiple parameters. The parameters include at least parameters related to color coordinates CIEx and CIEy in a chromaticity diagram. The method also includes determining an average first parameter $X_0$ and an average second parameter $Y_0$ based on the parameters for all of the plurality of LEDs. Then, for all possible combinations of M LEDs out of the LEDs in the plurality of LEDs, the method includes determining a group average first parameter and a group average second parameter based on the first and second parameters for all of the M LEDs, and selecting a group of M LEDs whose group average first parameter and second parameter are closest to $X_0$ and $Y_0$ as a candidate for forming a light emitter of M LEDs. In some embodiments, the method further includes removing the selected group of M LEDs from the plurality of LEDs and, for the remaining LEDs, repeating the processes of selecting a group of M LEDs as the next candidate for forming a light emitter and removing the selected group of M LEDs.

According to some embodiments of the invention, a method is provided for forming multiple-LED (light-emitting-diode) light emitters from a plurality of LEDs, wherein the number of LEDs in each emitter is an integer M. The method includes providing a plurality of LEDs, each of the LEDs characterized by a first parameter and a second parameter, the first parameter and the second parameter related to color coordinates CIEx and CIEy in a chromaticity diagram, respectively. The method also includes determining an average first parameter $X_0$ and an average second parameter $Y_0$ based on the first and second parameters for all of the plurality of LEDs. The method further includes, for all possible combinations of M LEDs out of the LEDs in the plurality of LEDs, determining a group average first parameter and a group average second parameter based on the first and second parameters for all of the M LEDs, and selecting a group of M LEDs whose group average first parameter and second parameter are closest to $X_0$ and $Y_0$ as a candidate for forming a light emitter of M LEDs. In some embodiments, the method further includes removing the selected group of M LEDs from the plurality of LEDs and, for the remaining LEDs, repeating the processes of selecting a group of M LEDs as the next candidate for forming a light emitter.

According to some embodiments of the present invention, a method is provided for forming multiple-LED (light-emitting-diode) light emitters from a plurality of LEDs. The method includes characterizing the plurality of LEDs according to first and second parameters of each LED, the first and second parameters being related to color coordinates CIEx and CIEy, respectively. The method also includes selecting a group of LEDs according to the first and second parameters related to color coordinates CIEx and CIEy, and forming an multiple-LED emitter using the selected group of LEDs. In an embodiment, the method also includes removing the selected group of LEDs from the plurality of LEDs, and, for the remaining LEDs, repeating the processes of selecting a group of LEDs for forming a multiple-LED emitter.

According to alternative embodiments of the invention, a method is provided for forming multiple-LED (light-emitting-diode) light emitters from a plurality of LEDs. The method includes characterizing the plurality of LEDs according to first and second parameters of each LED, the first and second parameters being related to color coordinates CIEx and CIEy, respectively. The method includes determining a target color characterized by a the first and second parameters, $X_0$ and $Y_0$, which are related to color coordinates CIEx and CIEy. For all possible combinations of M LEDs out of the LEDs in the plurality of LEDs, the method includes determining a group average first parameter and a group average second parameter based on the first and second parameters for all of the M LEDs in the group, and selecting a group of M LEDs based on the group average first parameter and second parameter and the target parameters, $X_0$ and $Y_0$, as a candidate for forming a light emitter of M LEDs. In a specific embodiment, the method also includes removing the selected group of LEDs from the plurality of LEDs and for the remaining LEDs, repeating the processes of selecting a group of LEDs for forming a multiple-LED emitter.

The following detailed description together with the accompanying drawings will provide a better understanding of the nature and advantages of the present invention.

DETAILED DESCRIPTION OF THE INVENTION

Conventional white light LED emitters suffer from wide color variation, because, for example, the deposited phosphor quantity is not uniform, and has large statistic variation. One solution to this problem is by sorting white chips. These phosphor-coated blue chips (also known as white chips) may be optically tested for their color, then sorted into "color bins"; each color bin has its prescribed color range. A multi-chip emitter can be made having, e.g. four LED chips per emitter, by combining complementary color bins to reduce the color variation. In our earlier work, we have developed technologies for coating phosphor over blue chips to make white chips and for making emitters having multiple LEDs. For example, U.S. Pat. No. 8,399,268 to Z. Mei describes a method for coating phosphor over LED chips, and U.S. Pat. No. 8,384,097 to X. Yan describes a method for forming an emitter using multiple LED chips, both of which are commonly owned and are incorporated by reference in their entirety herein.

Figure 1:
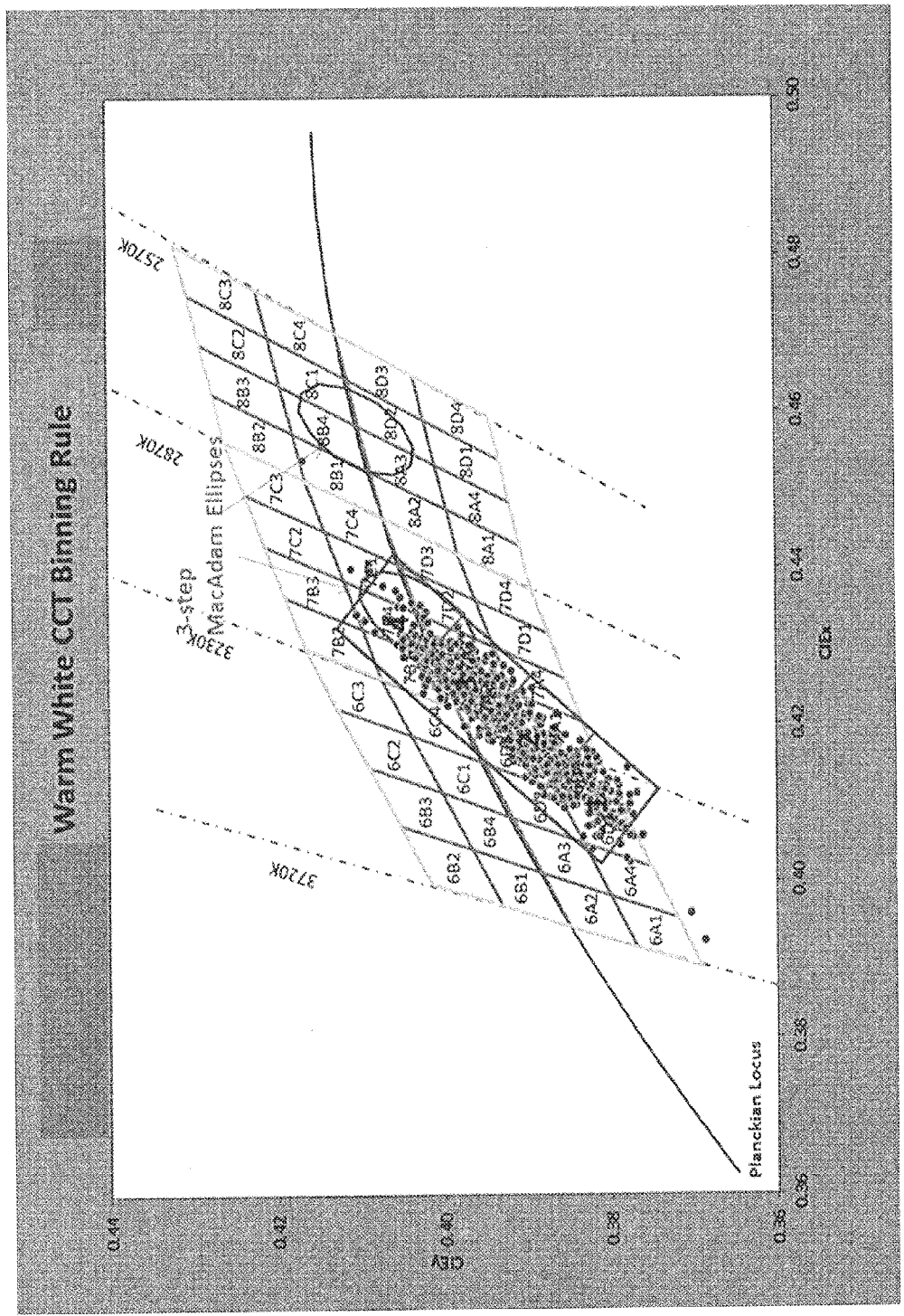
FIG. 1 shows a portion of a chromaticity diagram used for characterization of white light.

FIG. 1 shows a portion of a chromaticity diagram used for characterization of white light. The chromaticity diagram is a description of color spaces developed by International Commission on Illumination (CIE). As shown in FIG. 1 the x and y coordinates are often referred to as CIEx and CIEy. Color variations in a group of light sources are often described by MacAdam Ellipse, which refers to the region in a chromaticity diagram which contains all colors which are indistinguishable, to the average human eye, from the color at the center of the ellipse. The contour of the ellipse therefore represents the just noticeable differences of chromaticity. For example, one lot of the white chips can have color variation across 10 steps of a MacAdam Ellipse, as shown by the rectangle in FIG. 1. In one approach, these white chips are sorted into two bins, with each bin having a range of 5 steps. Two chips from the first bin and two chips the second bin are taken to make a 4-chip emitter. The emitters thus made will have the colors with the average of Bin 1 and Bin 2, and the range of 5 steps of MacAdam Ellipse. In another approach, the white chips may be sorted into four color bins (Bins 1-4), with each bin having the color range of 2.5 steps, as shown in FIG. 1. The chips from either Bins 2 and 3, or Bins 1 and 4 may be paired to make 4-chip emitters with color variation range of 2.5 steps.

In theory, it may be possible to use this method to make multichip emitters with any desirable small color range. For example, this may be achieved by dividing the white chips into many color bins, with each bin having the color range of the desirable small color range. The emitters are built from the paired white chips from the complementary bins. However, in reality, this method has limitations because of the manufacturing issues. The limitations include the following.

(1) A high number of color bins decreases the manufacturing efficiency. Suppose the white chips are divided into 12 bins sorted by color. The 12 bins are grouped into 6 complementary pairs. Each pair is used to make emitter separately. The process control, including part tracing, BOM (bill of materials) assignment, etc., can become burdensome.

(2) Too many color bins reduces the white chip usage percentage. Suppose the white chips are sorted into 2 color bins, chips from Bins 1 are paired to those from Bin 2. Usually, the number of chips in Bin 1 is not equal to the number of chips in Bin 2, e.g. Bin 1 has more chips than Bin 2. So there will be unpaired or left-over chips in Bin 1. The left-over chips in Bin 1 are not paired until the next lot of white chips arrives when we may supply extra Bin 2 chips. This problem of inequality of chips in the complementary bins becomes worse as the bin number increases.

In an embodiment of the present invention, after optical testing of white chips of a given production lot, instead of sort the LEDs into many color bins, all the LEDs are loaded onto one tape. Every chip on the tape has its color coordinates x and y (CIEx and CIEy) determined as its identity. In embodiments of the invention, a computer algorithm is then used to select and group individual white chips for making multichip emitters. The computer algorithm can be carried out using conventional computers. In some embodiments of the invention, each LED die is characterized by its color coordinates x and y (CIEx and CIEy), as well as a parameter related to the Lumen or radiant power of the LED die. In contrast, in the conventional method, the conventional binning of LED dice is usually based on only color coordinates CIEx and CIEy, and after binning and sorting, the LED chips lose their color coordinates as their identity; rather, their bin number becomes their identity.

As used herein, the lumen is the SI (The International System of Units) derived unit of luminous flux, a measure of the total amount of visible light emitted by a light source. Luminous flux differs from power (radiant flux) in that luminous flux measurements reflect the varying sensitivity of the human eye to different wavelengths of light, while radiant flux or radiant power measurements indicate the total power of all electromagnetic waves emitted, independent of the eye's ability to perceive it. A lux is one lumen per square meter. The radiant power is often measured in Watts per square meter.

According to embodiments of the present invention, a group of LEDs is selected from a plurality of LEDs for making a multiple-LED emitter. The group whose group properties best match that of a target light color is chosen as a candidate for making a multiple-LED emitter. In some embodiments, groups of LEDs are characterized according to group properties of the group of LEDs determined from color coordinates CIEx and CIEy of the LEDs in the group. In some embodiments, group properties of the group of LEDS can be determined from the colors and intensities of the LEDs in the group. The color properties can include color coordinates CIEx and CIEy. The intensity properties can include lumen or radiant power. The color properties and intensity properties can be determined using conventional color testing procedures.

In some embodiments, the target color may be determined with a weighted average property of the plurality of LEDs, and the group properties for each group may be determined with a weighted average property of each group of LEDs. Experimental data show that, starting with a plurality of LEDs that has large variations in its distribution of colors, methods in this invention can be used to select groups of LEDs to produce multiple-LED emitters with a tight color distribution within a region of the target color in a chromaticity diagram no larger than a 1-step MacAdam ellipse. In other words, the emitted colors are virtually indistinguishable to the average human eye.

Embodiments of the present invention provide methods that have many advantages. For example: (1) The method achieves the smallest possible color range for multichip emitters for a given lot of white chips with color variation, and (2) The manufacturing process is simple and white chips usage percentage is high.

Figure 2:
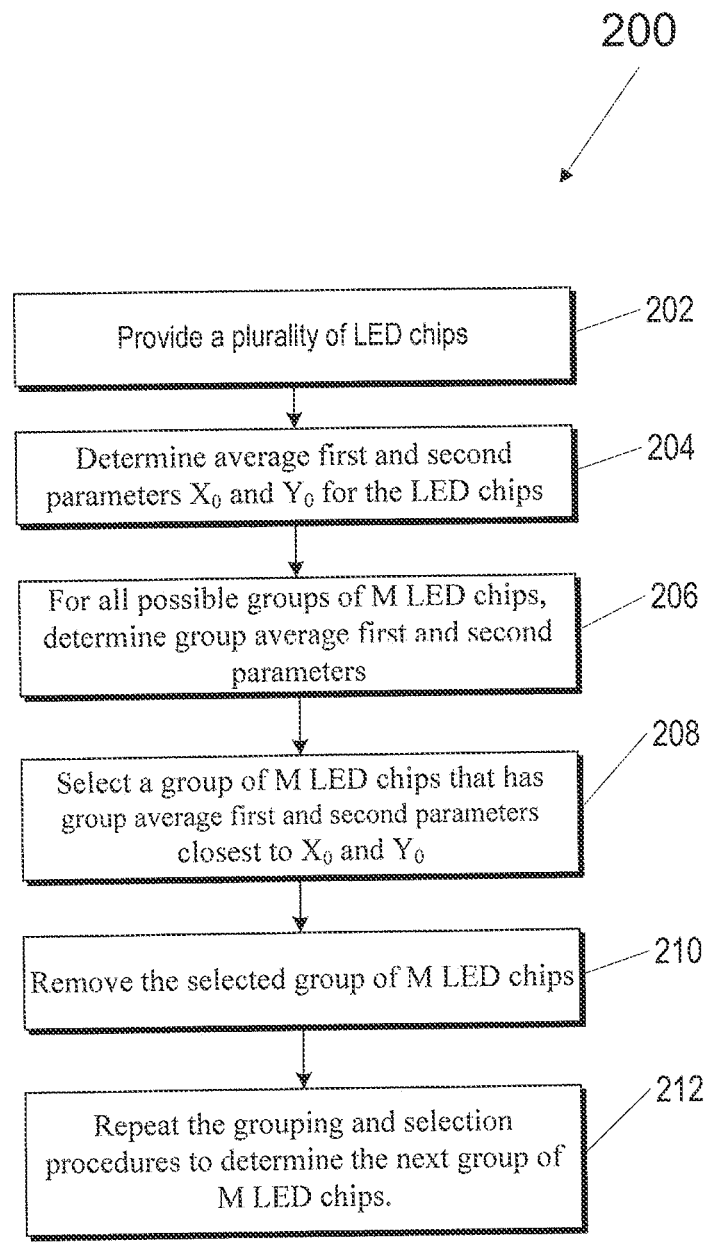
FIG. 2 is a simplified flowchart that illustrates a method for making light-emitting devices according to embodiments of the invention.

FIG. 2 is a simplified flowchart illustrating a method 200 for forming multiple-LED (light-emitting-diode) light emitters from a plurality of LEDs according to embodiments of the present invention. For example, let the number of LEDs in each emitter be an integer M. The method includes providing a plurality of LEDs, each of the LEDs characterized by multiple parameter (Step 202). The paremeters can include at least parameters that are related to color coordinates CIEx and CIEy in a chromaticity diagram. The method also includes determining an average first parameter $X_0$ and an average second parameter $Y_0$ for the plurality of LEDs, based on the parameters for all of the plurality of LEDs (Step 204). Then, for all possible combinations of M LEDs out of the LEDs in the plurality of LEDs, the method includes determining a group average first parameter and a group average second parameter based on the first and second parameters for all of the M LEDs in the group (Step 206), and selecting a group of M LEDs whose group average first parameter and second parameter are closest to $X_0$ and $Y_0$ as a candidate for forming a light emitter of M LEDs (Step 208). In some embodiments, the method further includes removing the selected group of M LEDs from the plurality of LEDs (Step 210) and for the remaining LEDs, repeating the processes of selecting a group of M LEDs as the next candidate for forming a light emitter and removing the selected group of M LEDs (Step 212).

In an embodiment of the above method, the weighted first parameter and weighted second parameter are related to CIEx and CIEy and are weighted by a factor related to a lumen of the LED. In another embodiment, the weighted first parameter and weighted second parameter are related to CIEx and CIEy weighted by a factor related to the radiant power of the LED. In another embodiment, determining a group average first parameter and a group average second parameter comprising determining weighted first and second parameters for each LED in the group. In another embodiment, selecting a group of M LEDs comprises calculating root mean square values between the group average first parameter and second parameter and the weighted first and second parameters of each LED and determining a group with the minimum root mean square value.

In some embodiments of the above method, each of the LEDs includes an LED chip having a phosphor-containing material disposed thereon. In an embodiment, each of the LEDs includes a blue LED having a phosphor-containing material including a green phosphor and a red phosphor disposed thereon. In another embodiment, each of the LEDs comprises a blue LED having a phosphor-containing material including a yellow phosphor and a red phosphor disposed thereon.

According to some embodiments of the invention, a method is provided for forming multiple-LED (light-emitting-diode) light emitters from a plurality of LEDs, wherein the number of LEDs in each emitter is an integer M. The method includes providing a plurality of LEDs, each of the LEDs characterized by a first parameter and a second parameter, the first parameter and the second parameter related to color coordinates CIEx and CIEy in a chromaticity diagram, respectively. The method also includes determining an average first parameter $X_0$ and an average second parameter $Y_0$ based on the first and second parameters for all of the plurality of LEDs. The method further includes, for all possible combinations of M LEDs out of the LEDs in the plurality of LEDs, determining a group average first parameter and a group average second parameter based on the first and second parameters for all of the M LEDs, and selecting a group of M LEDs whose group average first parameter and second parameter are closest to $X_0$ and $Y_0$ as a candidate for forming a light emitter of M LEDs. In some embodiments, the method further includes removing the selected group of M LEDs from the plurality of LEDs and, for the remaining LEDs, repeating the processes of selecting a group of M LEDs as the next candidate for forming a light emitter.

According to some embodiments of the present invention, a method is provided for forming multiple-LED (light-emitting-diode) light emitters from a plurality of LEDs. The method includes characterizing the plurality of LEDs according to first and second parameters of each LED, the first and second parameters being related to color coordinates CIEx and CIEy, respectively. The method also includes selecting a group of LEDs according to the first and second parameters related to color coordinates CIEx and CIEy, and forming an multiple-LED emitter using the selected group of LEDs. In an embodiment, the method also includes removing the selected group of LEDs from the plurality of LEDs, and, for the remaining LEDs, repeating the processes of selecting a group of LEDs for forming a multiple-LED emitter.

According to alternative embodiments of the invention, a method is provided for forming multiple-LED (light-emitting-diode) light emitters from a plurality of LEDs. The method includes characterizing the plurality of LEDs according to first and second parameters of each LED, the first and second parameters being related to color coordinates CIEx and CIEy, respectively. The method includes determining a target color characterized by a the first and second parameters, $X_0$ and $Y_0$, which are related to color coordinates CIEx and CIEy. For all possible combinations of M LEDs out of the LEDs in the plurality of LEDs, the method includes determining a group average first parameter and a group average second parameter based on the first and second parameters for all of the M LEDs in the group, and selecting a group of M LEDs based on the group average first parameter and second parameter and the target parameters, $X_0$ and $Y_0$, as a candidate for forming a light emitter of M LEDs. In a specific embodiment, the method also includes removing the selected group of LEDs from the plurality of LEDs and for the remaining LEDs, repeating the processes of selecting a group of LEDs for forming a multiple-LED emitter.

The methods described above are further explained with the following examples.

In an example, 4000 white chips are used to make 1000 emitters, each emitter having four LED chips. The method includes the following procedures.

1. Calculate the color parameters that are averaged over all white chips. Assume $x_i$, $y_i$, and $Y_i$ are the CIE-x, CIE-y, and lumen of $i_{th}$ chip, and a weighting factor defined as $w_i = Y_i/y_i$, $$x_0 = \Sigma_{i=1}^{4000}(x_i w_i/w), y_0 = \Sigma_{i=1}^{4000}(y_i w_i/w), \text{ where}$$
$$w = \Sigma_{i=1}^{4000}(w_i)$$

In this example, ($x_0$ and $y_0$) represents the color parameters of a target color. In other embodiment, the target color can be selected by different methods.

2. Consider all possible groups of four LED chips out of 4000 chips, and there are $C^4_{4000}$ possibilities. For every possible 4-chip combination, calculate its group average color coordinates:

$$x_n = \Sigma_{i=1}^{4}(x_{n,i} w_{n,i}/w_n), y_n = \Sigma_{i=1}^{4}(y_{n,i} w_{n,i}/w_n), w_n = \Sigma_{i=1}^{4}(w_{n,i})$$

where n represents a particular 4-chip combination; n=1, 2, ... $C^4_{4000}$. Assume $x_{n,i}$, $y_{n,i}$, and $Y_{n,i}$ are the CIEx, CIEy, and lumen of the four chips in $n_{th}$ 4-chip combination $w_{n,i}$ (i=1, 2, 3, and 4); $w_{n,i} = Y_{n,i}/y_{n,i}$ 3. Among the $C^4_{4000}$ combinations, select the one $(x_m, y_m)$ that is closest to $x_0$, $y_0$. In a specific embodiment, a minimum mean squared distance is used as the selecting criterion, as shown in the formula below.

$$(x_m, y_m) = \text{Min}\{\sqrt{(x_n - x_0)^2 + (y_n - x_0)^2}\},$$
$$\text{where } n = 1, 2, \ldots, C^4_{4000}.$$

4. Now, after the first four chips are chosen, e.g., with parameters $(x_{m,1}, y_{m,1})$, $(x_{m,2}, y_{m,2})$, $(x_{m,3}, y_{m,3})$, and $(x_{m,4}, y_{m,4})$, they are designated as a first group of four chips as candidate for forming a four-LED emitter. These four chips are removed from further consideration. There are now 3996 chips left for the next round of selection. The process continues with step #2 as described above, and is applied to the $C^4_{3996}$ possible four-chip combinations. For each of these combinations, group parameters are determined. Continue with the process in 3: select the one $(x_m, y_m)$ that is closest to $x_0$, $y_0$.

$$(x_m, y_m) = \text{Min}\{\sqrt{(x_n - x_0)^2 + (y_n - x_0)^2}\}, \text{ where}$$
$$n = 1, 2, \ldots, C^4_{3996}.$$

5. After the second group of four chips are chosen, with parameters $(x_{m,1}, y_{m,1})$, $(x_{m,2}, y_{m,2})$, $(x_{m,3}, y_{m,3})$, and $(x_{m,4}, y_{m,4})$, there are 3992 chips left. The next round of selection can be started, and there will be $C^4_{3992}$ combinations left. This process is repeated, and the next group is selected with parameters $(x_m, y_m)$ that is closest to $x_0$, $y_0$.

$$(x_m, y_m) = \text{Min}\{\sqrt{(x_n - x_0)^2 + (y_n - x_0)^2}\},$$
$$\text{where } n = 1, 2, \ldots, C^4_{3992}.$$

6. Repeat, until the 4000 chips are divided into 1000 groups, each group having four chips.

Instead of sorting the 1000 groups into 1000 tapes as would be in a conventional sorting process, all the chips kept on one tape, or one place in embodiments of the invention. A "smart" pick and place method is used during die attach process when building 4-chip emitters. Two different procedures can be used in embodiments of the invention.

1. Modify the software of a die bonder. Most conventional die attach machines pick up chips from tape sequentially, one followed by a next one. In embodiments of the invention, the machine is programmed to pick up chips according the sequence listed in a die tape map where the 1000 groups were labeled.

Figure 3:
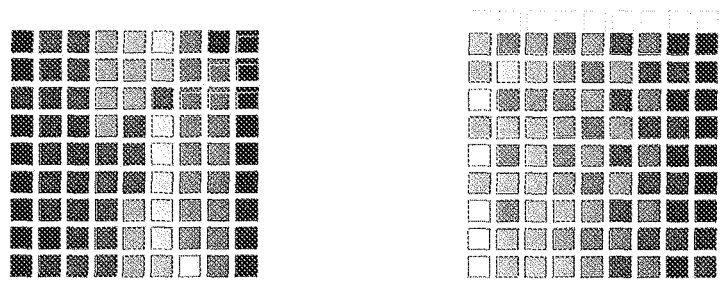
FIG. 3 shows two die sheets illustrating the positions of LED chips on the die sheet before and after sorting and rearrangement.

2. Modify the software of die sorter to reshuffle the sequence on the die tape; so when die bonder picks up die sequentially, it actually follows the sequence listed in the map. One example is shown in FIG. 3. FIG. 3 shows two die sheets illustrating the positions of LED chips on the die sheet before and after sorting and rearrangement. The graph on the left shows a plurality of LED chips on an original die sheet. The graph on the right shows the LED chips rearranged in a sequence in which the LED chips are pick up for forming the multiple LED emitters.

In some embodiments, the weighted averages of parameters are calculated using an alternative algorithm, as described below.

1. Calculate radiant power-weighted average of x y coordinates over all white chips (assume $x_i$, $y_i$, and $p_i$ are the CIE-x, CIE-y, and radiant power of $i_{th}$ chip):

$$x_0 = \Sigma_{i=1}^{4000}(x_i p_i/p), y_0 = \Sigma_{i=1}^{4000}(y_i p_i/p), \text{ where}$$
$$p = \Sigma_{i=1}^{4000}(p_i)$$

2. Pick any four out of 4000 chips, there are $C^4_{4000}$ possibilities. For every possible 4 chip combination, calculate its average color coordinate:

$$x_n = \sum_{i=1}^{4}\left(\frac{x_{n,i} p_{n,i}}{p_n}\right),$$

$$y_n = \sum_{i=1}^{4}\left(\frac{y_{n,i} p_{n,i}}{p_n}\right),$$

$$p_n = \sum_{i=1}^{4}(p_{n,i})$$

where n represents a particular 4-chip combination; n=1, 2, ... Assume $x_{n,i}$, $y_{n,i}$ and $p_{n,i}$ (i=1, 2, 3, and 4) are the CIE-x, CIE-y, and radiant power of the four chips in $n_{th}$ 4-chip combination.

In these embodiments, the parameters are weighted by a factor related to radiant power, which is related to perceived color for light in the visible wavelength.

Figure 4:
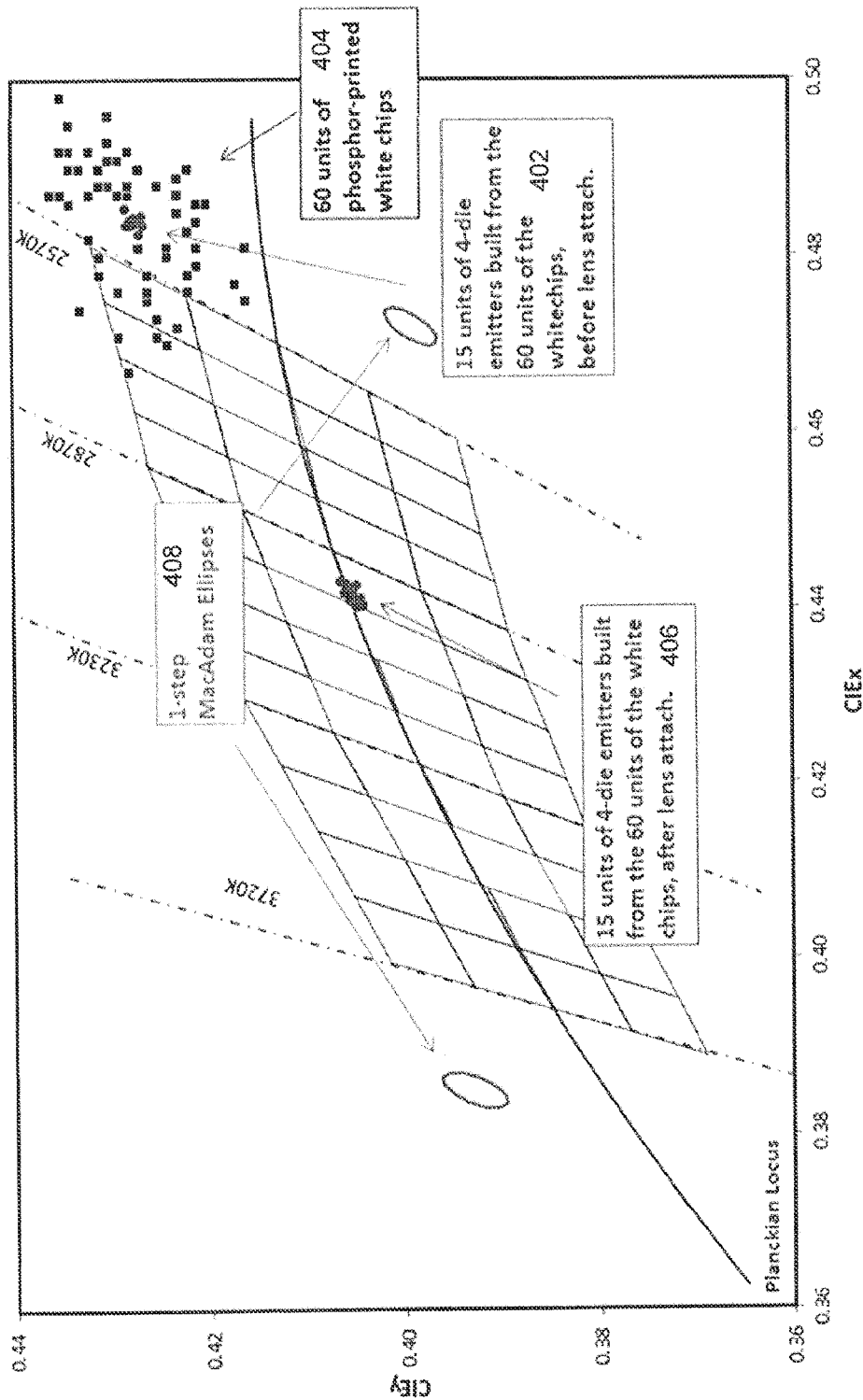
FIG. 4 shows a portion of a chromaticity diagram illustrating light distribution of light-emitting devices fabricated according to an embodiment of the present invention.

FIG. 4 shows a portion of a chromaticity diagram illustrating light distribution of light-emitting devices fabricated according to an embodiment of the present invention. The procedure started with 60 white chips with a large color distribution, as listed in Table I, and shown as the black squares 404 in FIG. 4. In Table I, C\color coordinates CIEx and CIEy for each of the 60 LED chip are listed, as is the radiant power for each LED chip in Watt/m^2. Using the method described above, the 60 chips are combined into 15 groups for building 15 units of 4-chip emitters, as listed in Table II. In FIG. 4, the color variation of the 15 emitters (402) is much less than that of the original group of 60 white chips (404).

TABLE I

| White chip ID | CIE-x | CIE-y | Watt/m^2 |
| --- | --- | --- | --- |
| 2 | 0.488 | 0.425 | 0.2346 |
| 3 | 0.488 | 0.425 | 0.221 |
| 4 | 0.487 | 0.428 | 0.2414 |
| 5 | 0.488 | 0.425 | 0.237 |
| 6 | 0.491 | 0.429 | 0.2307 |
| 7 | 0.49 | 0.434 | 0.2522 |
| 8 | 0.474 | 0.433 | 0.2578 |
| 9 | 0.475 | 0.426 | 0.2204 |
| 10 | 0.467 | 0.428 | 0.2607 |
| 11 | 0.478 | 0.431 | 0.2584 |
| 13 | 0.48 | 0.431 | 0.2588 |
| 15 | 0.471 | 0.425 | 0.2434 |
| 16 | 0.478 | 0.426 | 0.2373 |
| 17 | 0.482 | 0.432 | 0.2499 |

TABLE I-continued

| White chip ID | CIE-x | CIE-y | Watt/m^2 |
|---|---|---|---|
| 18 | 0.487 | 0.436 | 0.2514 |
| 19 | 0.487 | 0.429 | 0.2441 |
| 21 | 0.486 | 0.42 | 0.2395 |
| 22 | 0.49 | 0.433 | 0.2303 |
| 23 | 0.471 | 0.429 | 0.261 |
| 24 | 0.486 | 0.434 | 0.2322 |
| 25 | 0.496 | 0.43 | 0.2205 |
| 26 | 0.487 | 0.435 | 0.2458 |
| 27 | 0.485 | 0.423 | 0.2304 |
| 28 | 0.495 | 0.434 | 0.2276 |
| 29 | 0.498 | 0.435 | 0.2339 |
| 30 | 0.492 | 0.434 | 0.2364 |
| 31 | 0.481 | 0.424 | 0.2336 |
| 32 | 0.487 | 0.423 | 0.2387 |
| 33 | 0.492 | 0.428 | 0.2367 |
| 34 | 0.492 | 0.435 | 0.2363 |
| 35 | 0.488 | 0.43 | 0.2366 |
| 36 | 0.472 | 0.423 | 0.2331 |
| 37 | 0.488 | 0.428 | 0.2296 |
| 38 | 0.49 | 0.431 | 0.2405 |
| 39 | 0.475 | 0.416 | 0.2327 |
| 40 | 0.473 | 0.425 | 0.2344 |
| 42 | 0.488 | 0.431 | 0.24 |
| 43 | 0.481 | 0.427 | 0.2352 |
| 44 | 0.492 | 0.432 | 0.2353 |
| 45 | 0.476 | 0.429 | 0.2519 |
| 46 | 0.476 | 0.422 | 0.2521 |
| 47 | 0.479 | 0.421 | 0.2364 |
| 48 | 0.477 | 0.417 | 0.24 |
| 50 | 0.483 | 0.422 | 0.2438 |
| 51 | 0.481 | 0.416 | 0.2249 |
| 52 | 0.481 | 0.421 | 0.2118 |
| 53 | 0.486 | 0.421 | 0.2246 |
| 54 | 0.49 | 0.422 | 0.238 |
| 55 | 0.484 | 0.421 | 0.2305 |
| 56 | 0.478 | 0.422 | 0.2382 |
| 57 | 0.493 | 0.43 | 0.234 |
| 58 | 0.501 | 0.434 | 0.2325 |
| 59 | 0.48 | 0.424 | 0.2339 |
| 61 | 0.491 | 0.43 | 0.23 |
| 62 | 0.49 | 0.427 | 0.2122 |
| 63 | 0.489 | 0.423 | 0.2232 |
| 64 | 0.49 | 0.433 | 0.2371 |
| 65 | 0.476 | 0.426 | 0.2326 |
| 66 | 0.47 | 0.424 | 0.2455 |
| 67 | 0.487 | 0.432 | 0.2375 |

Table II lists 60 white chips as they are grouped into 15 groups according to the algorithm described above, for 15 units of 4-chip emitters. The white chips for each 4-chip emitters are listed, along with the color coordinates of each emitter, before dome lens attach, and after dome lens attach. Note that in this experiment, dome lenses are used, resulting in a blue color shifting.

TABLE II

| 4-die emitter ID | white Chip ID | Before dome lens | | After dome lens | |
|---|---|---|---|---|---|
| | | CIE-x | CIE-y | CIE-x | CIE-y |
| 1 | 2 | 0.4840 | 0.4274 | 0.4428 | 0.4057 |
| | 13 | | | | |
| | 18 | | | | |
| | 51 | | | | |
| 2 | 3 | 0.4843 | 0.4273 | 0.4425 | 0.4053 |
| | 43 | | | | |
| | 26 | | | | |
| | 52 | | | | |
| 3 | 4 | 0.4845 | 0.4273 | 0.4422 | 0.4051 |
| | 31 | | | | |
| | 5 | | | | |
| | 17 | | | | |
| 4 | 6 | 0.4842 | 0.4274 | 0.4432 | 0.4063 |
| | 16 | | | | |
| | 22 | | | | |
| | 56 | | | | |
| 5 | 7 | 0.4842 | 0.4274 | 0.4405 | 0.4041 |
| | 47 | | | | |
| | 9 | | | | |
| | 33 | | | | |
| 6 | 8 | 0.4838 | 0.4273 | 0.4410 | 0.4049 |
| | 54 | | | | |
| | 21 | | | | |
| | 24 | | | | |
| 7 | 10 | 0.4837 | 0.4281 | 0.4403 | 0.4040 |
| | 58 | | | | |
| | 30 | | | | |
| | 48 | | | | |
| 8 | 11 | 0.4841 | 0.4275 | 0.4432 | 0.4064 |
| | 63 | | | | |
| | 28 | | | | |
| | 46 | | | | |
| 9 | 15 | 0.4843 | 0.4274 | 0.4414 | 0.4049 |
| | 25 | | | | |
| | 27 | | | | |
| | 67 | | | | |
| 10 | 19 | 0.4843 | 0.4278 | 0.4427 | 0.4057 |
| | 59 | | | | |
| | 29 | | | | |
| | 36 | | | | |
| 11 | 23 | 0.4837 | 0.4278 | 0.4410 | 0.4053 |
| | 57 | | | | |
| | 42 | | | | |
| | 55 | | | | |
| 12 | 32 | 0.4847 | 0.4266 | 0.4427 | 0.4047 |
| | 45 | | | | |
| | 53 | | | | |
| | 64 | | | | |
| 13 | 34 | 0.4826 | 0.4268 | 0.4403 | 0.4046 |
| | 39 | | | | |
| | 38 | | | | |
| | 40 | | | | |
| 14 | 35 | 0.4837 | 0.4265 | 0.4413 | 0.4043 |
| | 50 | | | | |
| | 37 | | | | |
| | 65 | | | | |
| 15 | 44 | 0.4856 | 0.4282 | 0.4418 | 0.4060 |
| | 66 | | | | |
| | 61 | | | | |
| | 62 | | | | |

In FIG. 4, a dome lens is disposed over the 4-chip emitters, which results in a blue color shift (406), as shown in FIG. 4. Two ellipses 408, representing two of the 1-step MacAdam ellipses, are drawn to illustrate the regions on the chromaticity diagram which contains all colors that are indistinguishable to the average human eye. It can be seen that the tight distribution of the 15 4-chip emitters (406) occupies a region not larger than a 1-step MacAdam ellipses. In other words, the emitted colors are virtually indistinguishable to the average human eye. If a conventional binning method was used, the white chip color distribution would need to be divided into at least 30 color bins, and it would be impossible to build 15 emitters with 1-step of MacAdam Ellipse.

While the invention has been described with respect to specific embodiments, one skilled in the art will recognize that numerous modifications are possible. Thus, although the invention has been described with respect to specific embodiments, it will be appreciated that the invention is intended to cover all modifications and equivalents within the scope of the following claims.

What is claimed is:

1. A method for forming light emitters with multiple LEDs (light-emitting-diodes), wherein the number of LEDs in each emitter is an integer M, the method comprising:
   determining color coordinates CIEx and CIEy and intensity for each of a plurality of LEDs, wherein CIEx and CIEy are color coordinates in a CIE chromaticity diagram, and wherein N is the number of LEDs in the plurality of LEDs;
   determining a first parameter $X_0$ and a second parameter $Y_0$ for a target light color, wherein $X_0$ and $Y_0$ are related to CIEx and CIEy of each of the N LEDs and a weighting factor related to the intensity of each of the N LEDs;
   for each possible group of M LEDs out of the N LEDs in the plurality of LEDs:
      determining a first group parameter X and a second group parameter Y, wherein X and Y are related to CIEx and CIEy of each of the M LEDs and a weighting factor related to the intensity of each of the M LEDs; and
      determining a difference between the first and second group parameters X and Y of each LED in the group of M LEDs and $X_0$ and $Y_0$;
   selecting a first group of M LEDs whose first group parameter X and second group parameter Y are closest to $X_0$ and $Y_0$ as a first candidate for forming a light emitter with M LEDs;
   removing the selected first group of M LEDs from the plurality of LEDs; and
   for the LEDs remaining in the plurality of LEDs, repeating the above processes to select a group of M LEDs as the next candidate for forming a light emitter.

2. The method of claim 1, wherein the weighting factor is related to the lumen of the LEDs.

3. The method of claim 2, wherein the weighting factor is related to a ratio of lumen over CIE-y of each LED.

4. The method of claim 1, wherein the weighting factor is related to radiant power of the LEDs.

5. The method of claim 4, wherein the first parameter $X_0$ of the target light color is related to a sum of the CIEx of each of N LEDs multiplied by a ratio of the radiant power of each of the N LEDs divided by a sum of the radiant power of all N LEDs, and the second parameter $Y_0$ of the target light color is related to a sum of the CIEy of each of N LEDs multiplied by a ratio of the radiant power of each of the N LEDs divided by a sum of the radiant power of all N LEDs.

6. The method of claim 4, wherein the first group parameter X of each of the possible groups of M LEDs is related to a sum of the CIEx of each of M LEDs multiplied by a ratio of the radiant power of each of the M LEDs divided by a sum of the radiant power of all M LEDs in that group, and the second group parameter Y of each of the possible groups of M LEDs is related to a sum of the CIEy of each of M LEDs multiplied by a ratio of the radiant power of each of the M LEDs divided by a sum of the radiant power of all M LEDs in that group.

7. The method of claim 1, wherein selecting the first group of M LEDs comprises:
   calculating a root mean square difference between (X, Y) and ($X_0$, $Y_0$), wherein X and Y are the first and the second group parameters for each of the possible groups of M LEDs, and $X_0$ and $Y_0$ are first and the second parameters of the target light color, and
   selecting a group with the minimum root mean square difference.

8. The method of claim 1, wherein each of the LEDs comprises an LED chip having a phosphor-containing material disposed thereon.

9. The method of claim 8, wherein each of the LEDs comprises a blue LED having a phosphor-containing material including a green phosphor and a red phosphor disposed thereon.

10. The method of claim 8, wherein each of the LEDs comprises a blue LED having a phosphor-containing material including a yellow phosphor and a red phosphor disposed thereon.

11. A method for forming multiple-LED (light-emitting-diode) light emitters from a plurality of LEDs, the method comprising:
   characterizing the plurality of LEDs according to first and second parameters of each LED, the first and second parameters being related to color coordinates CIEx and CIEy, respectively;
   determining a target color, which is characterized by a first and second parameters, $X_0$ and $Y_0$, that are related to color coordinates CIEx and CIEy in a chromaticity diagram;
   for all possible combinations of M LEDs out of the LEDs in the plurality of LEDs:
      determining a first group parameter X and a second group parameter Y based on the first and second parameters for each of the M LEDs in the group; and
      determining a difference between the first and second parameters of each group and $X_0$ and $Y_0$;
   selecting a group of M LEDs that has the smallest difference as a candidate for forming a light emitter of M LEDs.

12. The method of claim 11, further comprising:
   removing the selected group of M LEDs from the plurality of LEDs; and
   for the remaining LEDs, repeating the process of selecting a group of M LEDs for forming a multiple-LED emitter.

13. The method of claim 11, wherein the first parameter $X_0$ and the second parameter $Y_0$ for the target light color is further related to a weighting factor related to the intensity of each of the plurality of LEDs.

14. The method of claim 13, wherein the weighting factor is related to the lumen of the LEDs.

15. The method of claim 13, wherein each of the weighting factor is related to a ratio of lumen over CIE-y of each LED.

16. The method of claim 13, wherein the weighting factor is related to the radiant power of the LEDs.

17. The method of claim 11, wherein the first group parameter X and the second group parameter Y for the group of M LEDs is further related to a weighting factor related to the intensity of each of the M LEDs.

18. The method of claim 17, wherein the weighting factors are related to the lumen of the LEDs.

19. The method of claim 17, wherein the weighting factors are related to the radiant power of the LEDs.

20. The method of claim 11, wherein each of the LEDs comprises an LED chip having a phosphor-containing material disposed thereon.

* * * * *